United States Patent [19]
Cooper, III

[11] 3,860,489
[45] Jan. 14, 1975

[54] PROCESS AND APPARATUS FOR THE AEROBIC CULTIVATION OF MICROORGANISMS

[75] Inventor: Peter Garfield Cooper, III, Pittsburgh, Pa.

[73] Assignee: Gulf Research & Development Company, Pittsburgh, Pa.

[22] Filed: Aug. 7, 1972

[21] Appl. No.: 278,477

[52] U.S. Cl................... 195/139, 195/140, 195/142
[51] Int. Cl.............................................. C12b 1/00
[58] Field of Search...................... 195/139, 142, 143

[56] References Cited
UNITED STATES PATENTS
3,536,305  10/1970  Lefrancois...................... 195/142 X
3,732,148  5/1973  Franekowiak et al........... 195/142 X Primary Examiner—Lionel M. Shapiro
Assistant Examiner—R. B. Penland

[57] ABSTRACT

A process and apparatus is provided for the aerobic cultivation of a microorganism wherein the oxygen-containing gas, e.g., air, is employed to effect (1) growth of the microorganism, (2) agitation of the fermentation mass and (3) removal of the heat of fermentation by evaporative cooling. The apparatus is a vessel which has a low L/D and at least one and preferably at least four draft tubes.

10 Claims, 4 Drawing Figures

PROCESS AND APPARATUS FOR THE AEROBIC CULTIVATION OF MICROORGANISMS

This invention relates to a method and apparatus for the aerobic cultivation of microorganisms on a liquid culture medium and, more particularly, to a method and apparatus for the aerobic cultivation of microorganisms on an assimilable carbon-containing substrate wherein an oxygen-containing gas such as air effects growth of the microorganisms, agitation of the fermentation mass and removal of heat from the fermentation mass.

Microorganisms, because of their high rate of multiplication, have received much attention in fermentation processes for producing amino acids such as lysine, methionine, leucine, isoleucine, valine, glutamic, aspartic, arginine, tryptophan and the like. Microorganisms have also been used in fermentation processes to produce saccharides, citric acid, salicylic acid and proteins, the latter being useful as food supplements for both animal and human consumption.

Suitable known sources of microorganism-assimilable carbon include carbohydrates such as glucose, fructose, maltose, mannose, starch hydrolysate, molasses, etc.; sulfite waste liquors; alcohols; aldehydes; ketones; and organic acids. Recently, a considerable amount of work has been conducted utilizing hydrocarbons derived from petroleum as a source of carbon for the growth of microorganisms. For example, a number of microorganisms have been found to grow on petroleum-containing substrates varying from normally gaseous hydrocarbons through normally liquid hydrocarbons and hydrocarbons that are solid under normal atmospheric conditions. One problem frequently encountered in cultivating a microorganism, particularly on a petroleum hydrocarbon or mixture of hydrocarbons and especially in warm climates, is the relatively high cost involved in removing the heat released during the growth of the microorganism.

During the growth of microorganisms a considerable amount of heat is released through the metabolic processes of the cell. With yeasts grown on a hydrocarbon-containing substrate, the heat released is higher per weight of yeast produced than for conventional carbohydrate substrates by virtue of the lower oxidation state and higher energy content of the hydrocarbon. This heat is produced at the relatively low fermentation temperature which makes it thermodynamically difficult to remove. In addition to the heat of fermentation produced in propagating microorganisms, there is some heat created by the high degree of agitation required to effect good contact between the microorganisms and their growth-supporting substrates. The net heat produced by the metabolic processes and the agitation must be removed in order to maintain the temperature of the fermentation mass at an active fermentation temperature, i.e., a temperature of about 20° to about 40° C. with yeasts, and preferably about 25° to about 35° C. with yeasts of the genera Torulopsis and Candida. In the past, the heat of fermentation has been removed by a heat exchanger employing a coolant at a lower temperature than the fermentation temperature. The heat exchanger has been coils within the fermentation vessel, an external exchanger or both. The coolant has been cold sea water, well wter or tower or mechanically cooled water. The cost of heat removal by these prior methods is a significant fraction of the production costs of yeast, amounting in some instances to as much as 15 percent of the overall production costs.

The heat of fermentation, $\Delta H_f$, is the actual heat released by the metabolic processes. It is expressed conventionally in units such as Kcal/gm. of microorganism produced. Although the heat of fermentation corresponds to the heat of reaction in a chemical reaction, the major difference is that the microorganism composition is somewhat variable, i.e., the elemental analysis and content of fat, carbohydrate and protein may vary with growth conditions and strain of organism. In addition, if the fermentation is conducted under certain conditions, e.g., a large excess of feed such as a paraffinic petroleum fraction, the yield of microorganism will be low and partially oxidized metabolic by-products will be produced. The purity and carbon number distribution of the paraffin are also significant factors in the amount of heat which is released in a hydrocarbon fermentation process. While the heat of fermentation may vary over wide limits, the mean value in the case of yeasts, is generally within the range of about 6 to about 8 Kcal/gm of yeast.

In accordance with the present invention, an improved fermentation vessel and process for the aerobic cultivation of microorganisms is provided wherein a gas containing free oxygen not only supplies the oxygen required to effect growth of the microorganisms and agitation of the fermentation mass but also to effect a substantial removal of the heat of fermentation by evaporative cooling. The process is applicable to any fermentation process whether the assimilable carbon source is a carbohydrate, an alcohol, an aldehyde, a ketone, an organic acid, a hydrocarbon or mixture of hydrocarbons derived from petroleum.

The fermentation vessel, in accordance with the present invention, comprises a vat having a low L/D where L is the height of the vat and D is the length of one side of a vat having a square cross-sectional configuration or the diameter of a vat having a circular cross-sectional configuration. A low L/D is desirable in order to minimize pressure drop in a vessel. In vessels having a high L/D the pressure drop between the top and bottom of the vessel becomes exceedingly high. While vessels having a high L/D provide economical operation when considering gas-liquid contacting by itself, I have found that a low L/D as defined herein is surprisingly more economical when overall costs for aerobic cultivation of microorganisms according to the present invention are considered. In one embodiment of the invention utilizing a square fermentation vessel measuring 43.6 feet per side, the height is 8.2 feet, i.e., an L/D of 1/5.2. In another embodiment of the invention utilizing a cylindrical fermentation vessel measuring 48 feet in diameter, the height is 8 feet, i.e., an L/D of 1/6. The L/D is preferably within the range of 1/2 to 1/20.

The fermentation vessel contains at least one, preferably at least 4 draft tubes. One or more draft tubes are essential in accordance with the present invention in order to effect efficient gas-liquid contacting and mixing of brew. If a similarly-shaped vessel is used with no draft tube or tubes, the efficiency of the process is considerably lowered. The number and size of the draft tubes in the vessel can vary over a wide range depending upon the size of the vessel. Naturally, as the cross-sectional area of the vessel increases, the number of draft tubes of a fixed size can also be increased. While there can be only 1 draft tube in the vessel, there can be as many as 20 draft tubes or more depending upon the size of the vessel and the size of the tube or tubes. In one embodiment of the invention utilizing a square fermentation vessel measuring 43.6 feet per side and 8.2 feet in height, there are nine 9-foot diameter draft tubes employed. Naturally, if smaller diameter draft tubes (e.g. 7-feet in diameter) are employed in this particular embodiment, the number of draft tubes can be increased to 15 to 16. In another embodiment of the invention utilizing a cylindrical fermentation vessel measuring 48 feet in diameter and 8 feet in height, there are sixteen 9-foot diameter draft tubes employed. In general, it is desirable to use a draft tube having a cross-sectional area such that the ratio of the cross-sectional area of a single draft tube to the cross-sectional area of the fermentation vessel is within the range of about 1:5 to about 1:35 single draft tube area:-fermentation vessel area, respectively. The size of the draft tubes can vary depending upon the size of the vessel in which they are placed. With smaller fermentation vessels, i.e., about 400 to about 900 square feet in area, the diameter of the draft tube is preferably within the range of about 5 to about 8 feet. In larger fermentation vessels, i.e., about 1200 to about 1900 square feet in area, the diameter of the draft tube is preferably within the range of about 9 to about 10 feet. In general, the ratio of the sum of the cross-sectional areas of all draft tubes in a fermentation vessel to the cross-sectional area of the fermentation vessel is within the range of about 0.15:1.0 to about 0.60:1.0, total draft tube area:-fermentation vessel area, respectively.

The fermentation vessel of the present invention is also provided with means for introducing gas containing free oxygen through a plurality of orifices extending over the entire bottom of the vessel except immediately under the draft tubes. The number and the size of the orifices can vary over a wide range provided that gas containing free oxygen is supplied in amounts sufficient not only for growth of the microorganism and agitation of the fermentation mass but also to effect sufficient evaporative cooling to remove heat evolved in the fermentation process. In general, the orifices are within the range of about 1 inch to about 3 inches.

In addition, the fermentation vessel is equipped with means for introducing aqueous nutrient medium, microorganism, carbon source material, water and alkaline pH-controlling material.

The top of the fermentation vessel is open to the atmosphere but the vessel can be placed under a protective covering such as an air-supported plastic sheet to shield the vessel from contamination from the elements. The fermentation vessel is also equipped with means for removing fermentation mass for further processing and recovery of the product.

The process of the invention, in general, comprises introducing an aqueous nutrient medium, a carbon source material and a viable culture of a microorganism into a fermentation vessel (as described hereinabove) having a low L/D and at least one, preferably at least 4 draft tubes. The fermentation mass thus formed is contacted with a gas containing free oxygen by introducing said gas into the lower portion of the fermentation mass in the fermentation vessel through a plurality of orifices positioned in the bottom of the fermentation vessel. The amount of said gas which is introduced through said orifices is sufficient to effect (1) growth of the microorganism, (2) agitation of the fermentation mass and (3) removal of the heat of fermentation by evaporation of water from the fermentation mass. The gas containing free oxygen travels upwardly through the fermentation mass in the area surrounding the draft tubes. The cultivation of microorganism in the growth-supporting mixture of aqueous nutrient medium, carbon source material and gas containing free oxygen is continued in the fermentation vessel until the cell concentration of the microorganism in the fermentation mass reaches a maximum under logarithmic growth. Thereafter, propagation of the microorganism in the fermentation vessel is conducted by continuously introducing aqueous nutrient medium, hydrocarbon and gas containing free oxygen through the fermentation mass in the area surrounding the draft tubes, the amount of said gas being sufficient to effect (1) growth of the microorganism (2) agitation of the fermentation mass and (3) removal of the heat of fermentation by evaporation of water from the fermentation mass; and withdrawing a portion of the fermentation mass from the fermentation vessel, said portion which is withdrawn being about equal to the volume of aqueous nutrient medium and carbon source material which is introduced into the fermentation vessel. The pH of the fermentation mass is controlled during the fermentation process by the continuous or intermittent addition of a suitable alkaline material such as sodium hydroxide, ammonium hydroxide and ammonia. The temperature of the fermentation mass is controlled by the amount of gas containing free oxygen which is bubbled through the fermentation mass. As the temperature of the fermentation mass increases, the amount of the free oxygen-containing gas is increased which causes a greater portion of the water in the fermentation mass to evaporate into the atmosphere and thereby reduce the temperature of the fermentation mass. If desired, supplemental cooling can be effected by circulating a portion of the fermentation mass through an external heat exchanger or by placing cooling coils within the fermentation vessel. While the amount of the free oxygen-containing gas introduced into the fermentation vessel can be manually controlled, it is preferred to employ an automatic temperature controller wherein a temperature sensing device located in the fermentation mass is operatively connected to a dispensing means for introducing greater or lesser amounts of the free oxygen-containing gas into the fermentation vessel. Thus, if the temperature of the fermentation mass falls below a predetermined limit the amount of the free oxygen-containing gas introduced into the fermentation vessel is decreased. If the temperature of the fermentation mass exceeds a predetermined optimum limit, the amount of the free oxygen-containing gas introduced into the fermentation vessel is increased. Water is introduced into the fermentation vessel in an amount approximately equal to the amount of water removed by evaporation during the evaporative cooling of the fermentation mass. The fermentation mass which is withdrawn from the fermentation vessel is further processed to recover the desired microorganism. If desired, the further processing can include the use of a second fermentation vessel similar to that described hereinabove in order to effect maturation of the microorganism. If a second fermentation vessel is utilized to mature the microorganism, such maturation is preferably effected at a temperature which is about 15° to about 20° C. below that which is employed in the first fermentation vessel in the presence of an aqueous nutrient medium and a gas containing free oxygen in the absence of added carbon source material as described more fully and claimed in U.S. Pat. No. 3,620,927 which issued on Nov. 16, 1971 to W. W. Leathen.

The process of the present invention can be operated either continuously or in batch or semi-batch form. It is preferred, however, to operate the process continuously. In the continuous cultivation process, the composition of the nutrient medium and the number of cells in said medium, once the process has been initiated, is maintained substantially constant. The growth rate of the cells in the culture is also maintained essentially constant. The growth rate of the cells depends upon a number of factors including the composition of the nutrient medium, the carbon source, the pH of the medium, aeration, temperature and the particular microorganism employed.

Microorganisms which can be cultivated in the process of the invention include molds, bacteria and yeasts. Typical examples of molds are those of the family Aspergillaceae, suitable genera of which are Penicillium and Aspergillus. Specific examples of molds within these genera are *Penicillium rocqueforti, Penicillium glaucum, Penicillium chrysogenum, Penicillium patulum, Penicillium notatum, Penicillium espansum, Aspergillus fumigatus, Aspergillus carbonarious, Aspergillus niger, Aspergillus flavus, Aspergillus terreus* and *Aspergillus versicolor*.

Bacteria which can be employed in the process of the invention are those within the group consisting of Pseudomonadales, Eubacteriales and Actinomycetales. The bacteria which are employed are preferably of the families Bacillaceae and pseudonomadaceae, preferred species being *Bacillus megaterium, Bacillus subtilis* and *Pseudomonas aeruginosa*.

Yeasts which can be employed in the process of the invention are preferably those of the family Cryptococcaceae and especially of the sub-family Cryptococcoideae. Other yeasts can also be employed such as those of the family Ascosporogeneous and especially of the sub-family Saccharomycoideae. Preferred genera of the Cryptococcoideae sub-family are Torulopsis and Candida. Preferred strains of yeast are *Candida utilis, Candida rugosa, Candida lipolytica, Candida tropicalis* and *Torulopsis colliculosa*. When the carbon source material is a petroleum hydrocarbon and the microorganism is a yeast, a strain of *Candida tropicalis* is preferred, particularly *Candida tropicalis*, strains CS-8-17 and CS-9-5 which are essentially identical strains which have been isolated from petroleum-soaked soils. *Candida tropicalis*, strains CS-8-17 and CS-9-5 have been deposited in the American Type Culture Collection in Rockville, Md. These strains have been assigned the ATCC numbers 20021 and 20326, respectively. The advantage of utilizing a microorganism which has been isolated from an oil-soaked soil is that the organism is already adapted to metabolize hydrocarbons so that an initial hydrocarbon-adaptation procedure is not necessary. If the microorganism, particularly yeast, has been grown in a carbohydrate environment, the carbon source material should be a carbohydrate, or, if a hydrocarbon is used as the carbon source material, it will be necessary to adapt the organism to grow on carbon supplied by the hydrocarbon. This procedure may require a prolonged period of time. Even yeasts which have been isolated from oil-soaked soil may require an adaptation procedure to adapt the yeast to grow on the particular hydrocarbon which is intended to be used as feedstock in the fermentation process.

When the carbon source material which is utilized in the process of the invention is a hydrocarbon, it can be either a saturated or unsaturated aliphatic hydrocarbon having up to 30 or more carbon atoms per molecule. A preferred hydrocarbon feedstock is a petroleum fraction, especially a petroleum fraction consisting essentially of a mixture of straight chain hydrocarbons. The straight chain hydrocarbons can be present as olefins, paraffins or a mixture containing both olefins and paraffins. Examples of individual hydrocarbons which can be used are n-pentane, 1-pentene, n-hexane, 1-hexene, n-heptane, 1-heptene, n-octane, n-decane, 1-decene, n-dodecane, 1-dodecene, n-tetradecane, 1-tetradecene, n-hexadecane, n-octadecane, n-eicosane, n-tetracosane, n-triacontane and the like. Those hydrocarbons which are liquid at the fermentation conditions employed are preferred. While the individual hydrocarbons can be used, I prefer, for economic reasons to use mixtures of hydrocarbons. Thus, I may use kerosene, gas oil, middle distillate fractions, slack wax and the like. Good results have been obtained with hydrocarbon mixtures comprising naphtha ($C_6$–$C_{13}$), n-paraffins ($C_9$–$C_{13}$), n-paraffins ($C_{13}$–$C_{18}$), alpha olefins ($C_{10}$–$C_{16}$), kerosene ($C_9$–$C_{16}$) and slack wax ($C_{17}$–$C_{29}$) alone and in admixture with naphtha. The amount of hydrocarbon employed is that amount required to provide sufficient carbon to support growth of the microorganism during the fermentation period. The hydrocarbon is added continuously during the fermentation period in that amount required to effect the desired growth without any appreciable excess to avoid subsequent separation difficulties. In general, pure n-paraffins are added at a rate of about 1 to about 5 grams of paraffin per liter of the fermentation mass (brew-air free basis) per hour. When a hydrocarbon mixture is employed, the mixture is added at a rate proportioned to the normal paraffin content, so that the amount of normal paraffin added is about 1 to about 5 grams of paraffin per liter of brew in the fermenter per hour.

Inasmuch as microorganisms are made-up of living cells, their growth, as is true with other living organisms, depends upon an adequate supply of carbon, hydrogen, oxygen, nitrogen and trace amounts of other elements including sodium, potassium, phosphorus, magnesium and iron. Carbon is required for growth and energy. Nitrogen is required for synthesis of protein and other nitrogenous materials. Other elements are required for cellular processes. In the present process, carbon and hydrogen are supplied by any carbon-assimilable source material as disclosed hereinabove; oxygen is supplied by the introduction of air; and nitrogen is supplied through the use of ammonium or other nitrogenous inorganic salts in the aqueous nutrient medium. Tract quantities of other elements necessary for growth of the microorganism may be supplied as impurities in the inorganic salts or these elements may be added directly in extremely small amounts. Frequently, sufficient quantities of the trace elements are present in tap water.

The make-up of the aqueous nutrient medium employed in the process of the invention can vary to some extent depending upon the type of microorganism used and the type of carbon source material. In general, the aqueous nutrient medium comprises a mixture of mineral salts which furnish ions of ammonium, nitrate or nitrite, potassium, ferrous or ferric, calcium, magnesium, phosphate, sulfate, as well as ions of trace elements including zinc, manganese, copper and molybdenum. Inasmuch as water is included in the nutrient mixture, many of the mineral salts can be incorporated into the substrate in sufficient quantity through the use of tap water. It is desirable, however, to add the salts to the mixture to insure their presence in sufficient quantity for growth of the microorganism. The nutrient mixture consists primarily of water, which may constitute about 50 to 99 percent by weight or more of the total nutrient mixture. Generally, the water is employed in an amount normally used in microbial synthesis. In general the aqueous nutrient medium is added at a rate of about 0.10 to about 0.30 liter per liter of brew in the fermentation vessel per hour, a preferred rate for most favorable growth of *Candida tropicalis* (CS-8-17) or (CS-9-5) on a hydrocarbon-containing substrate being about 0.15 to about 0.25 liter per liter of brew per hour.

During the course of the growth of a hydrocarbon-assimilating microorganism on a hydrocarbon substrate in the presence of an aqueous mineral nutrient medium and an oxygen containing gas, oxygen is absorbed and carbon dioxide is liberated, and acidic substances are formed. The net effect of these processes is a reduction of the pH of the aqueous nutrient medium. Thus, to prevent a build-up of acidity which adversely affects the growth of the microorganism, it is essential to add an alkaline material to restore the pH of the aqueous nutrient medium to a desired level. If the pH is not maintained at a desired level, the growth of the microorganism ceases, that is cellular density no longer increases so that a stationary growth phase is encountered.

The optimum pH of the aqueous nutrient medium depends somewhat upon the nature of the substrate and the particular microorganism being cultured. The pH is usually within the range of about 1.5 to about 8. With mineral salts substrates, the optimum pH for most yeast cultures is a pH of about 5. When employing a yeast nitrogen base substrate, optimum growth for a yeast of the strain of *Candida tropicalis* occurs at a pH of about 2.5 to 5, a pH of about 3 being preferred. While optimum ranges of pH for molds is also within the range of about 2.5 to 5, bacteria usually requires a higher pH in the order of about 6 to 8. In order to maintain the pH at any desired level, I may add to the aqueous nutrient medium any suitable alkaline material such as sodium hydroxide, potassium hydroxide, disodium hydrogen phosphate, ammonium hydroxide and ammonia.

A medium typical of the type used for propagation of a strain of *Candida tropicalis* utilizing a hydrocarbon as the carbon source contains the following concentrations of macro-ions, micro-ions and the vitamin, D-biotin.

Such a medium can be prepared by dissolving the following compounds in a quantity of distilled water such that the solution volume is equal to 1 liter.

|  | Grams |
|---|---|
| Potassium dihydrogen phosphate, $KH_2PO_4$ | 3 |
| Magnesium sulfate, $MgSO_4.7H_2O$ | 1 |
| Sodium nitrate, $NaNO_3$ | 0.07 |
| Calcium nitrate, $Ca(NO_3)_2.4H_2O$ | 0.08 |
| Ammonium sulfate, $(NH_4)_2SO_4$ | 0.66 |
| Sulfuric acid, concentrated (93% $H_2SO_4$) | 0.291 |
|  | Micrograms |
| D-Biotin | 5 |
| Copper Sulfate, $CuSO_4.5H_2O$ | 240 |
| Zinc sulfate, $ZnSo_4.7H_2O$ | 2400 |
| Manganese sulfate, $MnSO_4.H_2O$ | 800 |
| Cobalt nitrate, $Co(NO_3)_2.6H_2O$ | 15 |
| Sodium molybdate, $NaMoO_4$ | 400 |
| Potassium iodide, KI | 200 |
| Boric acid, $H_3BO_3$ | 1000 |
| Ferric chloride, $FeCl_3.6H_2O$ | 400 |

Oxygen, as disclosed hereinabove, is one of the essential elements required to promote the growth of the microorganism. While pure oxygen can be employed, I prefer for economic reasons to supply the oxygen as air. In order to effect an optimum growth of the microorganism, the air should be finely dispersed through the substrate. Various air introducing means can be used including a perforated plate in the bottom of the fermentation vessel or a series of pipes located in the bottom of the fermentation vessel. The amount of air employed depends upon the amount of cooling required and the ambient air conditions, but in most instances comprises about 5 to about 65 standard cubic feet per minute (SCFM) per cubic foot of brew (degassed basis) in the fermentation vessel.

The optimum temperature for the growth of the microorganism in the start up phase of the process and in the continuous phase is dependent upon the particular organism employed but will usually be within the range of about 20° to about 40° C. When using a strain of a hydrocarbon-assimilable *Candida tropicalis* the preferred temperature range is about 25° to about 35° C.

Microorganisms grown under controlled conditions in the presence of variable amounts of all nutrients required to support growth and under environmental conditions favorable to growth typically grow in a characteristic pattern which may be designated as follows:

1. Initial stationary phase — In this phase, the number of microorganisms remains constant.
2. Lag phase — During this period, the rate of multiplication increases with time.
3. Logarithmic growth phase — The rate of multiplication remains constant; the generation time is the same throughout the period.
4. Negative growth phase — During this phase, the rate of multiplication decreases and the average gener-

| Macro-ions | PPM | Micro-ions | PPM | Others | PPM |
|---|---|---|---|---|---|
| N (as $NH_4^+$) | 140 | B | 0.175 | D-Biotin | 0.005 |
| $SO_4$ | 1143.5 | I | 0.153 |  |  |
| $PO_4$ | 2093.65 | Cu | 0.0536 |  |  |
| $NO_3$ | 95.2 | Zn | 0.5457 |  |  |
| Ca | 13.6 | Mn | 0.26 |  |  |
| Mg | 98.66 | Mo | 0.175 |  |  |
| Na | 19.67 | Co | 0.003 |  |  |
| K | 861.93 | Fe | 0.0826 |  |  | ation time increases. The organisms continue to increase in number, but at a slower rate than during the logarithmic phase.

5. Maximum stationary phase — The number of living organisms remains constant, i.e., the death rate equals the rate of reproduction.

6. Accelerated death phase — The number of microorganisms declines with increasing rapidity. The average rate of death increases to a maximum.

7. Logarithmic death phase — In this period, the rate of death is constant.

According to the present invention, when the cell concentration reaches a maximum in the logarithmic growth phase in a batch process, the cells are harvested. In a continuous process, the process upon reaching the logarithmic growth phase, is placed in continuous operation. The process continues while maintaining the cell concentration at the maximum reached during the logarithmic growth phase. When the process is in continuous operation, a fraction containing the desired microorganism is continuously removed from the fermentation mass. The desired microorganism is then separated from the withdrawn fraction by conventional means such as by centrifuging. Thereafter, the microorganism is washed one to three times with tap water and finally dried under mild conditions but under conditions sufficiently severe to assure recovery of a non-viable microorganism containing not more than about 10 percent moisture, usually about 3 to about 5 percent moisture. With bacteria, the drying temperature may be as high as 100° C. The drying temperature for most yeasts to insure the recovery of non-viable cells in an oven is within the range of about 50° to about 75° C. If spray drying is employed, the temperature of the dryer may be in the order of about 150° C. without adversely affecting the quality of the yeast. In drum drying a strain of *Candida tropicalis*, non-viable cells are recovered by employing a drying temperature of about 120° C.

In accordance with the present invention, the aqueous nutrient medium and carbon source material, in the fermentation vessel, is initially seeded with about 0.1 to about 3 grams of microorganism per liter of aqueous nutrient medium. Culturing is initiated and continued under aerobic conditions until the cell concentration increases to about 5 to about 25 grams (dry cell basis) per liter in the logarithmic growth phase. When the cell concentration reaches a maximum within the range of about 5 to about 25 grams (dry) per liter, continuous aerobic culturing is initiated and thereafter continued in the presence of aqueous nutrient medium and carbon source material, the cell concentration in the brew withdrawn continuing at said maximum of about 5 to about 25 grams (dry) per liter. Of course, in a batch process, the cells are harvested when the cell concentration reaches a maximum.

The invention will be more readily understood by referring to FIGS. 1 to 4. While the fermentation vessels shown in FIGS. 1 to 4 are square-type, fermentation vessels, since vessels of a square configuration are readily and economically constructed from a material such as concrete, it should be understood that the geometrical shape is not critical and that circular, rectangular, octagonal, elliptical, etc. designs can be employed. It is only necessary that the fermentation vessel have a low L/D, i.e., about 1/2 to about 1/20, and that sufficient air-introducing means be employed to effect growth of the microorganism, agitation of the fermentation mass and evaporative cooling of the fermentation mass to remove heat which is released in the fermentation process.

FIG. 1 is a schematic view partly in elevation and partly in cross section showing a preferred form of a fermentation vessel according to the present invention. While the fermentation vessel shown in FIG. 1 contains 9 draft tubes, it is to be understood that more or fewer than 9 draft tubes can be employed. If desired, a number of such fermentation vessels can be placed adjacent to each other to form a large fermentation area. Air is introduced into the fermentation vessel through a perforated plate positioned just above the bottom of the fermentation vessel. The vessel can be constructed of any suitable material. For economic reasons, I prefer to construct the vessel of concrete. The surfaces coming in contact with the fermentation mass are preferably coated with polyester glass. The draft tubes can be constructed of any suitable material. Preferably the draft tubes are made from a polyester.

FIG. 2 is a partial horizontal section of a fermentation vessel of the invention wherein air is introduced through apertures in a pipe.

FIG. 3 is a partial vertical section of a fermentation vessel of the invention showing the draft tubes and the introduction of air through apertures in a pipe.

Figure 1:
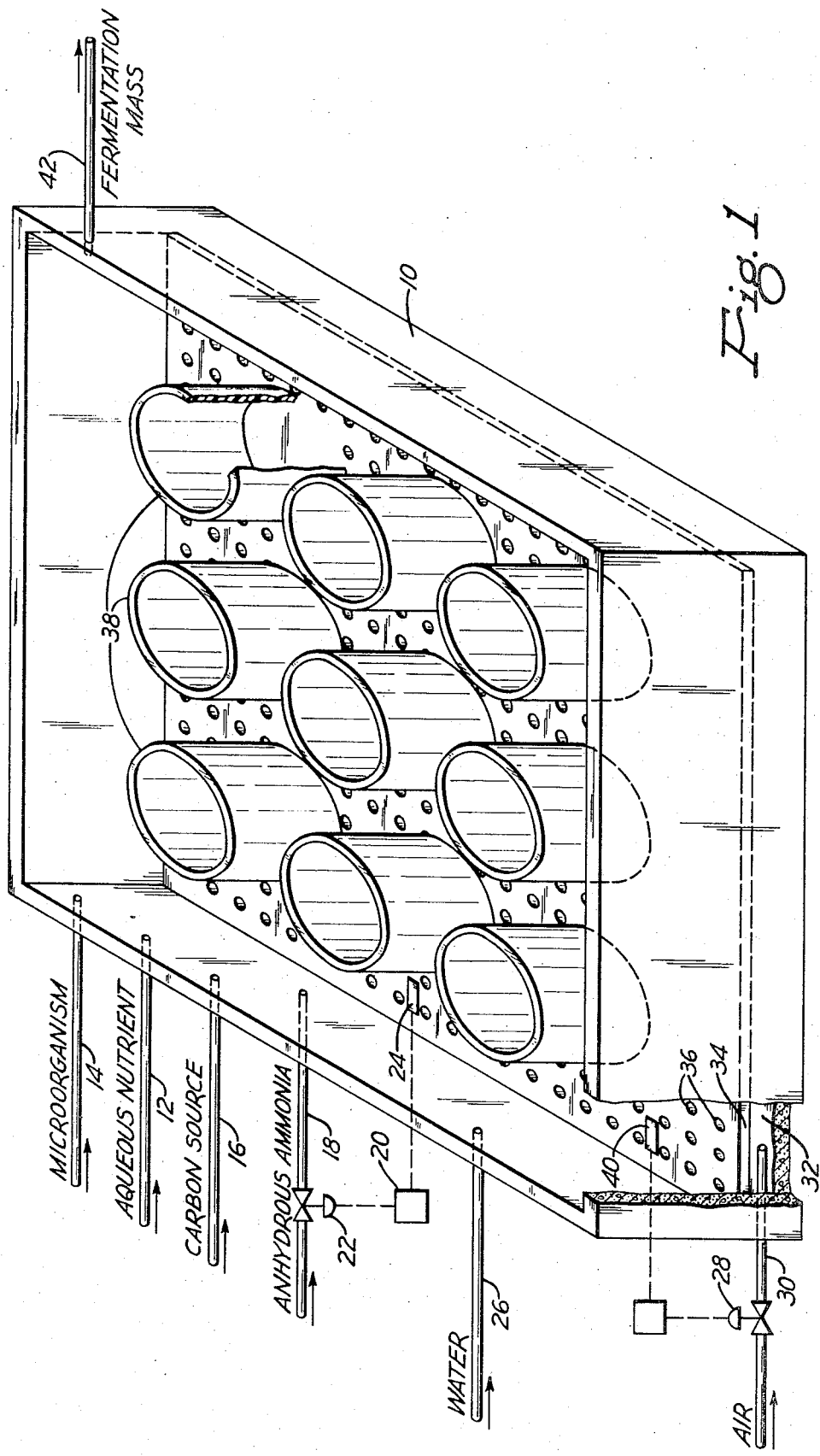

Referring not to FIG. 1, aqueous nutrient medium is introduced into fermentation vessel 10 through line 12. The aqueous nutrient medium in fermentation vessel 10 is seeded with a microorganism which is introduced into fermentation vessel 10 through line 14. A carbon source material to furnish carbon for the growth of the microorganism is introduced into fermentation vessel 10 through line 16. Anhydrous ammonia as required to maintain the desired pH of the fermentation mass is introduced into fermentation vessel 10 through line 18 by pH controller 20 and flow control valve 22. While not shown in detail, the pH value of the culture medium is controlled by conventional standard reference and glass electrodes 24 immersed in the fermentation mass. As the pH of the fermentation mass drops below a predetermined limit, the solenoid in control valve 22 causes the valve to open and allow ammonia to flow through line 18 to fermentation vessel 10. A suitable form of this automatic pH control is described in an article entitled "Automatic Control of pH Value in Cultures of Micro-organisms" by D. Callow and S. Pirt in the Journal of General Microbiology, volume 14, page 661 (1956). Water is introduced into fermentation vessel 10 through line 26. Air is introduced through control valve 28 and line 30 into space 32 below a perforated plate 34 positioned just above the bottom of fermentation vessel 10. The air is finely dispersed through the fermentation mass in vessel 10 by openings 36 in the perforated plate 34. The air rises through the fermentation mass in the area surrounding draft tubes 38. As the air travels upwardly through the fermentation mass, the fermentation mass surrounding the draft tubes becomes less dense than the fermentation mass within the draft tubes. Thus, the fermentation mass being more dense within the draft tubes flows downwardly within the draft tubes and upwardly outside the draft tubes thus giving good contact of the constituents within the fermentation vessel. As the cultivation in the fermentation vessel continues, the temperature of the fermentation mass increases because of the heat released by the metabolic processes and the heat of agitation. As the temperature of the fermentation mass increases beyond a predetermined optimum limit, sensing device 40 causes a solenoid in control valve 28 to open and allow more air to enter. As the amount of air increases, a greater amount of water is evaporated from the fermentation vessel 10. As the amount of water which evaporates increases, a greater amount of heat is removed from the fermentation mass. When the temperature of the fermentation mass drops to the desired value, the control valve 28 partially closes to allow less air to enter the fermentation vessel. As the amount of water which is evaporated from fermentation vessel 10 increases, additional water to offset the water of evaporation is introduced through line 26. The fermentation mass in the vessel is just above the draft tubes. Fermentation mass is continuously removed from the upper portion of fermentation vessel 10 through line 42.

In a fermentation unit having a capacity to produce 100 million pounds of dry yeast per year, nine square fermentation vessels 43.6 feet square by 8.2 feet high are placed adjacent to each other to form a square fermentation unit. Each fermentation vessel in the fermentation unit is constructed of concrete the inner surfaces of which are coated with polyester glass. The walls and bottom of each fermentation vessel are 8 inches thick. The fermentation unit has a square cross section, each side being 131 feet in length. The fermentation unit is 8.2 feet in height. Each fermentation vessel contains 9 polyester draft tubes each of which is 9 feet in diameter and 5 to 6 feet in height. The perforated plate in the bottom of the fermentation vessel is 1 to 6 inches above the bottom of the vessel. The draft tubes are about 12 inches above the perforated plate. The perforated plate is made of stainless steel drilled with 1-inch holes. If adequately supported, the perforated plate can be constructed from fiberglass. The fermentation unit has a nominal total volume of $1.41 \times 10^5$ cubic feet or a total volume in terms of gassed brew capacity of $1.17 \times 10^5$ cubic feet. ($6.30 \times 10^4$ cu.ft. of degassed brew) The unit is capable of producing 3 gm./l.-hr (0.187 lb./cu.ft.-hr) of yeast product. The air rate ranges from about 300,000 to about 4,000,000 standard cubic feet per minute. The gassed brew has a density of about 25 to about 50 pounds per cubic foot. In a high, dry area, the evaporation capacity of the fermentation unit based on an ambient temperature of 75° F., a wet bulb temperature of 56° F., a relative humidity of 58 percent, an atmospheric pressure of 11.06 psia and 85 percent saturation, is about $31 \times 10^{-3}$ pound of water per pound of dry air. In a low coastal area or where atmospheric conditions are similar to those in coastal areas, the evaporation capacity of the fermentation unit based on an ambient temperature of 90° F., a wet bulb temperature of 73° F., a relative humidity of 58 percent, an atmospheric pressure of 14.7 psia and 85 percent saturation, is about $8.4 \times 10^{-3}$ pound of water per pound of dry air. Because of the large amount of air required in areas similar to low, coastal areas, it may be desirable to supplement the evaporative cooling of the fermentation mass with some refrigeration.

Figure 2:
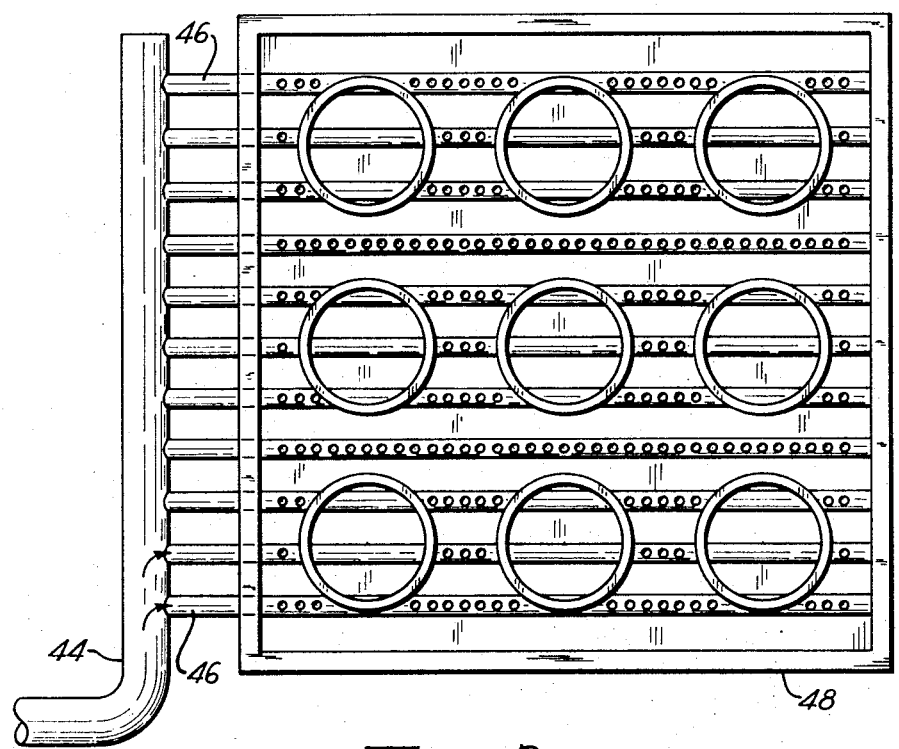
FIGS. 2 and 3 illustrate other means of introducing air into the bottom of the fermentation vessel.
Figure 3:
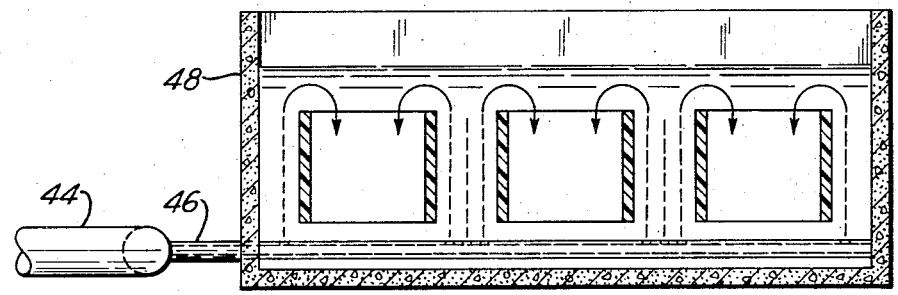

In FIGS. 2 and 3 for purposes of simplicity, horizontal and vertical sections, respectively, of the fermentation vessel are shown. Compressed air is supplied by a compressor (not shown) to header 44. Header 44 is connected to each of pipes 46 which are positioned on the bottom of the fermentation vessel. The pipes are drilled with 1-inch holes to allow air to bubble up through the fermentation mass. In a commercial unit, the walls 48 of the fermentation vessel are made of concrete and are about 8.2 feet high and 8 inches thick.

While the process and apparatus of the invention are applicable to any fermentation process regardless of the microorganism used and the assimilable carbon source, the invention will be described more fully hereinafter with respect to a preferred embodiment thereof utilizing a hydrocarbon as the carbon source material and a hydrocarbon-consuming microorganism.

Figure 4:
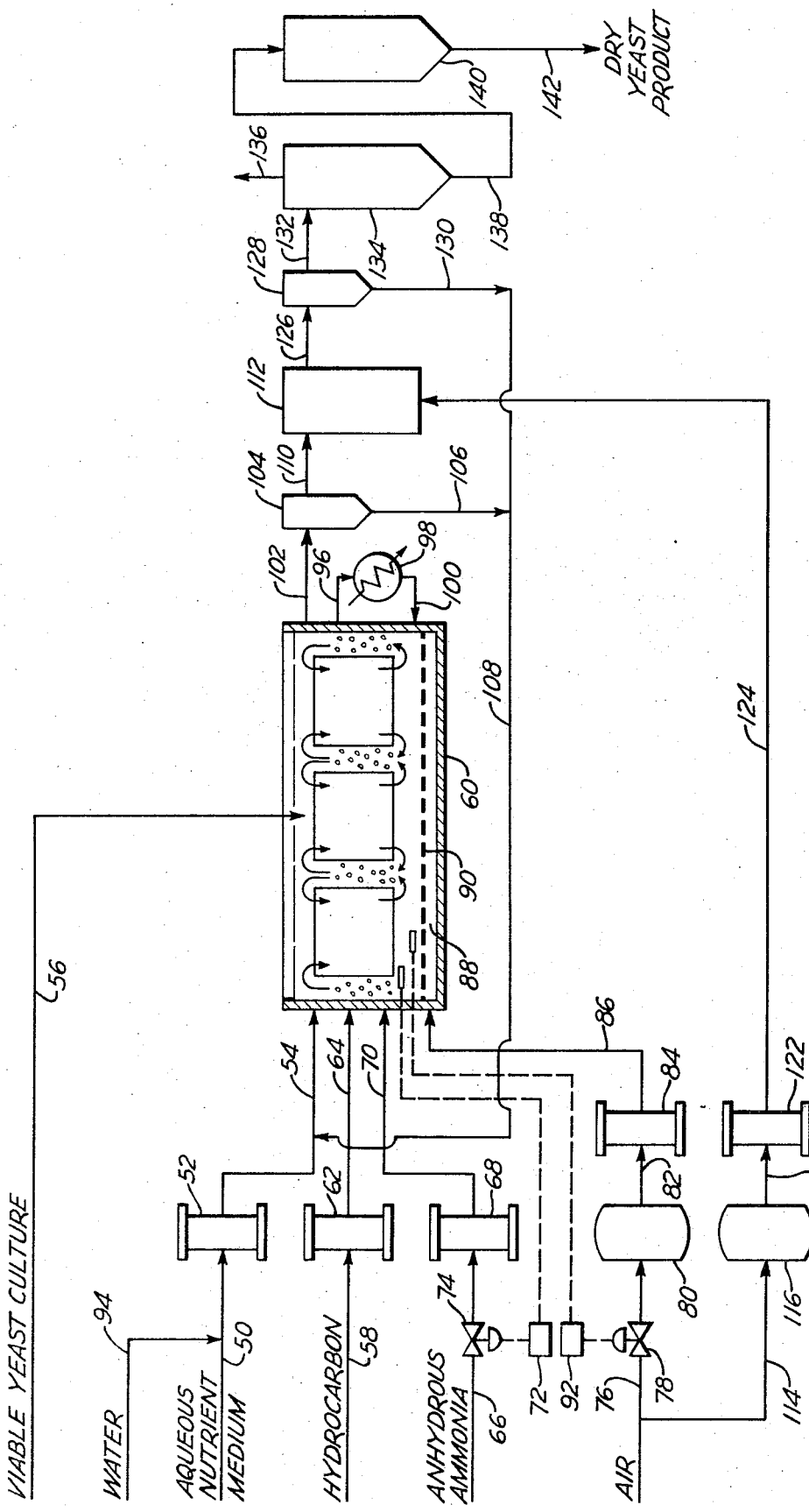
FIG. 4 is a schematic flow diagram which illustrates the process of the invention utilizing a fermentation vessel of the invention.

Referring now to FIG. 4, the process of the invention will be described in connection with the cultivation of *Candida tropicalis* (CS-9-5) (ATCC 20326). An aqueous nutrient medium having a typical composition as described hereinabove is introduced through line 50, filter 52 and line 54 to fermentation vessel 60. The aqueous nutrient medium in fermentation vessel 60 is charged with a viable yeast culture *Candida tropicalis* (CS-9-5) (ATCC 20326) which is introduced into fermentation vessel 60 through line 56. The amount of viable yeast culture introduced into fermentation vessel 60 is an amount sufficient to give a concentration of about 0.1 to about 3 grams of yeast per liter of aqueous nutrient medium.

A hydrocarbon charge stock to furnish carbon for the growth of the yeast is introduced into fermentation vessel 60 through line 58, filter 62 and line 64. The hydrocarbon charge stock comprises a $C_{13}$ to $C_{18}$ normal paraffin mixture having the following approximate normal paraffin distribution:

| n-Paraffin | Weight Percent |
| --- | --- |
| $C_{13}$ | 4.4 |
| $C_{14}$ | 18.1 |
| $C_{15}$ | 25.6 |
| $C_{16}$ | 27.2 |
| $C_{17}$ | 21.8 |
| $C_{18}$ | 2.9 |

Anhydrous ammonia as required to maintain a pH of about 3 is introduced into fermentation vessel 60 through line 66, filter 68 and line 70 by pH controller 72 and flow control valve 74. Air is introduced through line 76, flow control valve 78, compressor 80, line 82, filter 84 and line 86 into space 88 below perforated plate 90 just above the bottom of fermentation vessel 60. The air bubbles up through the fermentation mass in fermentation vessel 60 in the area surrounding the draft tubes and escapes into the atmosphere carrying evaporated water with it. As the temperature of the fermentation mass increases, additional air is introduced into the fermentation vessel by temperature controller 92 which automatically operates flow control valve 78. In the cultivation of *Candida tropicalis* (CS-9-5), the temperature in fermentation vessel is maintained at about 30° C. (86° F.). As the amount of water which is evaporated from fermentation vessel 60 increases, additional water to offset the water of evaporation is introduced into fermentation vessel 60 through line 94, filter 52 and line 54. If desired, supplemental cooling of the fermentation mass can be effected by circulating a portion of the fermentation mass from fermentation vessel 60 through line 96, heat exchanger 98 and line 100.

When the cell concentration in fermentation vessel 60 reaches a maximum of about 5 to about 25 grams (dry cell basis) per liter of fermentation mass, a portion of the fermentation mass is withdrawn from fermentation vessel 60 through line 102 and introduced into centrifuge 104 or other means for concentrating or separating the microorganism such as a filter, a foam flotation device, etc. In a batch process, the cells are harvested at this point. For a continuous fermentation as shown in the flow diagram, the residence time required to obtain a steady state cell concentration of about 5 to about 25 grams (dry) per liter of fermentation mass in fermentation vessel 60, in most instances, is about 4 to about 8 hours. The fermentation mass in line 102 comprises about 1.5 to about 2.5 percent (by weight) dry solids. Continuous propagation of *Candida tropicalis* is thereafter effected by continuously removing a portion of the fermentation mass containing *Candida tropicalis* from fermentation vessel 60 through line 102 while continuously introducing into fermentation vessel 60 additional amounts of aqueous nutrient medium through lines 50 and 54, hydrocarbon through lines 58 and 64, air through lines 76, 82 and 86 and, as needed, water through lines 94 and 54 and anhydrous ammonia through lines 66 and 70. The temperature of the fermentation mass is continuously controlled by temperature controller 92 as described above. The pH of the fermentation mass is continuously controlled at a value of about 3 by pH controller 72 as described above. In centrifuge 104, the fermentation mass is separated into an aqueous nutrient fraction and a yeast cream fraction. The aqueous nutrient fraction which is separated in centrifuge 104 is returned as recycle medium through lines 106, 108 and 54 to fermentation vessel 60. The yeast cream fraction comprising a 6 percent (by weight) yeast cream is removed from centrifuge 104 through line 110. The yeast cream fraction thus obtained can be processed to obtain a dried yeast product or it can be further treated as shown in the flow diagram by introducing the cream fraction into a maturation vessel 112.

In maturation vessel 112, the fermentation mass is further contacted with air introduced through line 114, compressor 116, line 120, filter 122 and line 124. In maturation vessel 112 any remaining hydrocarbon is greatly reduced or eliminated while the yield of product is increased and the amount of ash which is normally formed is decreased. Maturation is preferably effected at a temperature which is 15° to 20° C. below the temperature at which active fermentation is conducted, i.e., a temperature of about 10° to about 20° C. (50° to 68° F.). A matured fermentation mass is removed from maturation vessel 112 by line 126. The matured fermentation mass is then passed through line 126 to centrifuge 128 or other means of concentration. In centrifuge 128, a further portion of aqueous nutrient medium is removed and returned as recycle medium through lines 130, 108 and 54 to fermentation vessel 60. Centrifuged fermentation mass comprising a 20 percent (by weight) yeast cream is removed from centrifuge 128 through line 132. The yeast is then passed through line 132 to an evaporator 134.

Evaporator 134 can be of a commercial type such as a wiped film evaporator or a forced circulation evaporator. In evaporator 134, water vapor is removed through line 136 and a yeast cream is removed through line 138. The product which is removed from evaporator 134 through line 138 comprises a 40 percent (by weight) yeast cream. The concentrated (40 percent by weight) yeast cream is then introduced into dryer 140. Dryer 140 can be a commercial type such as a spray dryer. In dryer 140 the yeast cream is dried to give a dry yeast product which is transferred to storage or packaging through line 142. The dried yeast product has a moisture content of about 3 percent (by weight).

The make-up of the dried yeast product [*Candida tropicalis* (CS-9-5)] obtained in the illustrative process of the present invention may vary slightly over an extended period of operation. However, a typical chemical composition of the dried product is as follows:

|  | *Candida tropicalis* (CS-9-5) Percent by weight |
|---|---|
| Moisture | 2.9 |
| Total nitrogen | 9.12 |
| Crude protein | 57.0 |
| Total Amino acids | 47.0 |
| Ash | 9.7 |
| Fat | 1.5 |
| Fiber | 8.7 |

Typical analyses for the amino acid distribution in the protein fraction of *Candida tropicalis* (CS-9-5) are as follows:

| Amino Acids | *Candida tropicalis* (CS-9-5) Percent by weight of Product, Dry Basis |
|---|---|
| Lysine | 4.2 |
| Histidine | 1.3 |
| Arginine | 2.8 |
| Aspartic Acid | 5.3 |
| Threonine | 2.8 |
| Serine | 2.4 |
| Glutamic Acid | 5.9 |
| Proline | 1.6 |
| Glycine | 2.3 |
| Alanine | 2.9 |
| Cystine | 0.8 |
| Valine | 3.2 |
| Methionine | 0.6 |
| Isoleucine | 2.6 |
| Leucine | 4.0 |
| Tyrosine | 1.8 |
| Phenylalanine | 2.2 |
| Tryptophan | 0.6 |

While my invention has been described with reference to various specific examples and embodiments, it will be understood that the invention is not limited to such examples and embodiments and may be variously practiced within the scope of the claims hereinafter made.

I claim:

1. An improved fermentation vessel for the aerobic cultivation of a microorganism which comprises a vat adapted to hold a fermentation mass and having an L/D of about 1/2 to about 1/20 where L is the height of said vat and D is the length of one side of said vat having a square cross-sectional configuration or the diameter of said vat having a circular cross-sectional configuration, said vat containing at least one draft tube adapted to permit the flow of fermentation mass downwardly within said draft tube and upwardly outside of said draft tube, said vat also containing means for introducing therein aqueous nutrient medium, microorganism, assimilable carbon source, water, gas containing free oxygen and alkaline pH-controlling material and means for withdrawing a fermentation mass therefrom, said means for introducing gas containing free oxygen comprising a plurality of orifices extending over the bottom of the vat except immediately under the draft tubes.

2. A fermentation vessel according to claim 1 further characterized in that said means for introducing gas containing free oxygen into said vat is operatively connected to a temperature sensing device within said vat.

3. A fermentation vessel according to claim 1 further characterized in that said means for introducing alkaline pH-controlling material into said vat is operatively connected to a pH-measuring device within said vat.

4. A fermentation vessel according to claim 1 wherein the means for introducing gas containing free oxygen in the bottom of the vat is a perforated plate.

5. A fermentation vessel according to claim 1 wherein the means for introducing gas containing free oxygen in the bottom of the vat is a pipe containing apertures therein.

6. A fermentation vessel according to claim 1 wherein the ratio of the cross-sectional area of a single draft tube to the cross-sectional area of the vat is within the range of about 1:5 to about 1:35, single draft tube area:vat area, respectively.

7. A fermentation vessel according to claim 6 wherein the ratio of the sum of the cross-sectional areas of all draft tubes in the vat to the cross-sectional area of the vat is within the range of about 0.15:1.0 to about 0.60:1.0 total draft tube area:vat area, respectively.

8. A fermentation vessel according to claim 1 wherein the cross-sectional configuration of the vat is square having an L/D of about 1/16.

9. A fermentation vessel according to claim 8 wherein the ratio of the cross-sectional area of a single draft tube to the cross sectional area of the vat is about 1:30.

10. A fermentation vessel according to claim 9 wherein the number of draft tubes in the vat is 9 and the ratio of the sum of the cross-sectional areas of all draft tubes in the vat to the cross-sectional area of the vat is about 0.3:1.

* * * * *